US010668565B2

(12) United States Patent
Capostagno et al.

(10) Patent No.: US 10,668,565 B2
(45) Date of Patent: Jun. 2, 2020

(54) APPARATUS AND METHOD FOR OVERLAP LASER WELDING

(71) Applicant: SPI Lasers UK Limited, Hedge End (GB)

(72) Inventors: Daniel Anthony Capostagno, Santa Clara, CA (US); Jacek Tadeusz Gabzdyl, East Boldre (GB)

(73) Assignee: SPI Lasers UK Limited, Hedge End (GB)

( * ) Notice: Subject to any disclaimer, the term of this patent is extended or adjusted under 35 U.S.C. 154(b) by 252 days.

(21) Appl. No.: 15/549,526

(22) PCT Filed: Feb. 8, 2016

(86) PCT No.: PCT/GB2016/000029
§ 371 (c)(1),
(2) Date: Aug. 8, 2017

(87) PCT Pub. No.: WO2016/128705
PCT Pub. Date: Aug. 18, 2016

(65) Prior Publication Data
US 2018/0029163 A1 Feb. 1, 2018

(30) Foreign Application Priority Data
Feb. 9, 2015 (GB) .................................. 1502149.6

(51) Int. Cl.
*B23K 26/244* (2014.01)
*B23K 26/14* (2014.01)
(Continued)

(52) U.S. Cl.
CPC ........ *B23K 26/244* (2015.10); *B23K 26/0622* (2015.10); *B23K 26/082* (2015.10);
(Continued)

(58) Field of Classification Search
CPC .............. B23K 26/244; B23K 26/0622; B23K 26/323; B23K 26/14; B23K 26/22
(Continued)

(56) References Cited

U.S. PATENT DOCUMENTS 4,873,415 A * 10/1989 Johnson ................. B23K 26/24
219/121.64
5,502,292 A * 3/1996 Pernicka ................. B23K 26/24
219/121.63
(Continued)

FOREIGN PATENT DOCUMENTS

CN 105855706 A 8/2016
CN 205764438 U 12/2016
(Continued)

OTHER PUBLICATIONS

Yu, Yu, Levin and V.A. Erofeev, Calculation of the parameters of pulsed laser welding of thin sheets of aluminum alloys, Welding International vol. 23, No. 12, Dec. 2009, pp. 934-938.
(Continued)

Primary Examiner — Jimmy Chou
(74) Attorney, Agent, or Firm — Iandiorio Teska & Coleman, LLP

(57) ABSTRACT

Apparatus for laser welding a first metal part (1) to a second metal part (2), which apparatus comprises: a laser (3) which emits a laser beam (6) in the form of laser pulses (21), a scanner (4) for moving the laser beam (6) with respect to a metal surface (7) of the first metal part (1), an objective lens (5) which focuses the laser beam (6) onto the metal surface (7), and a controller (12) which controls the scanner (4) such that it moves the laser beam (6) with respect to the metal surface (7) to a plurality of focussed spots (16), characterised in that the apparatus focuses the laser pulses (21) with a spot size (34) and a pulse fluence (36) that causes the formation of a plurality of melt pools (19) in the first metal (Continued)

part (1) and heat stakes (17) in the second metal part (2), each heat stake (17) extends from a different one of the melt pools (19) and has a distal end (101), and the controller (12) spaces the focussed spots (16) apart by a distance (18) that is small enough to cause the melt pools (19) to overlap and that is large enough to ensure the distal ends (101) of the heat stakes (17) are distinct and separate from each other in at least one direction (108).

6 Claims, 5 Drawing Sheets

(51) Int. Cl.
    B23K 26/22    (2006.01)
    B23K 26/323    (2014.01)
    B23K 26/082    (2014.01)
    B23K 26/0622    (2014.01)

(52) U.S. Cl.
    CPC ............ *B23K 26/14* (2013.01); *B23K 26/22* (2013.01); *B23K 26/323* (2015.10)

(58) Field of Classification Search
    USPC ............ 219/121.15, 121.45, 121.46, 121.47, 219/121.63, 121.64, 121.73, 121.84
    See application file for complete search history.

(56) References Cited

U.S. PATENT DOCUMENTS

| | | | |
|---|---|---|---|
| 6,285,002 B1 | 9/2001 | Ngoi et al. | |
| 8,116,341 B2* | 2/2012 | Lei | H05K 3/0035 219/121.71 |
| 8,314,359 B2* | 11/2012 | Bovatsek | B23K 26/0617 219/121.64 |
| 8,847,110 B2* | 9/2014 | Gu | B23K 26/073 219/121.68 |
| 8,847,112 B2* | 9/2014 | Panarello | B23K 26/364 219/121.69 |
| 9,138,913 B2* | 9/2015 | Arai | B28D 5/00 |
| 9,636,773 B2* | 5/2017 | Bovatsek | B23K 26/0617 |
| 9,873,168 B2* | 1/2018 | Lee | B23K 26/0884 |
| 2002/0079296 A1* | 6/2002 | Dijken | B23K 26/22 219/121.64 |
| 2004/0118818 A1* | 6/2004 | Oda | B23K 26/0608 219/121.64 |
| 2004/0173587 A1* | 9/2004 | Musselman | B23K 1/00 219/121.64 |
| 2004/0200813 A1* | 10/2004 | Alips | B23K 15/0046 219/121.63 |
| 2005/0121426 A1* | 6/2005 | Wang | B23K 26/32 219/121.64 |
| 2005/0173387 A1* | 8/2005 | Fukuyo | B23K 26/03 219/121.67 |
| 2007/0051706 A1* | 3/2007 | Bovatsek | B23K 26/0617 219/121.69 |
| 2007/0062919 A1 | 3/2007 | Hamada et al. | |
| 2007/0272665 A1* | 11/2007 | Becker | B23K 26/32 219/121.64 |
| 2008/0035611 A1* | 2/2008 | Kuno | B28D 1/221 219/69.1 |
| 2009/0283505 A1* | 11/2009 | Naumovski | C10M 169/04 219/121.64 |
| 2010/0025387 A1* | 2/2010 | Arai | B28D 5/00 219/121.69 |
| 2011/0139753 A1* | 6/2011 | Lee | B23K 26/244 219/121.64 |
| 2011/0300691 A1* | 12/2011 | Sakamoto | B23K 26/03 438/462 |
| 2012/0061356 A1* | 3/2012 | Fukumitsu | B23K 26/0613 219/121.61 |
| 2012/0067858 A1* | 3/2012 | Kangastupa | B28D 5/0011 219/121.72 |
| 2012/0125899 A1* | 5/2012 | Oh | B23K 26/032 219/121.64 |
| 2012/0211474 A1* | 8/2012 | Hayashimoto | B23K 26/0665 219/121.64 |
| 2013/0070428 A1* | 3/2013 | Kangastupa | H01L 23/562 361/746 |
| 2013/0087540 A1* | 4/2013 | Gu | B23K 26/32 219/121.64 |
| 2013/0119025 A1* | 5/2013 | Lee | B23K 26/0884 219/121.64 |
| 2014/0048518 A1* | 2/2014 | Ogura | B23K 26/22 219/121.64 |
| 2014/0126167 A1* | 5/2014 | Bozorgi | B81C 1/00269 361/760 |
| 2014/0251963 A1* | 9/2014 | Kawaguchi | B23K 26/0665 219/121.73 |
| 2014/0291304 A1* | 10/2014 | Mudd, II | B23K 26/32 219/121.61 |
| 2015/0121962 A1* | 5/2015 | Jiang | C03B 33/07 65/102 |
| 2015/0165548 A1* | 6/2015 | Marjanovic | B23K 26/083 428/43 |
| 2015/0166391 A1* | 6/2015 | Marjanovic | C03B 33/0222 428/43 |
| 2015/0166394 A1* | 6/2015 | Marjanovic | B23K 26/0624 428/43 |
| 2015/0217399 A1* | 8/2015 | Tajikara | B23K 26/083 225/2 |
| 2015/0232369 A1* | 8/2015 | Marjanovic | C03B 33/0215 428/192 |
| 2016/0016261 A1* | 1/2016 | Mudd, II | B23K 26/082 219/121.61 |
| 2016/0039045 A1* | 2/2016 | Webster | B23K 26/032 356/496 |
| 2017/0001262 A1* | 1/2017 | Song | B23K 26/323 |
| 2018/0022634 A1* | 1/2018 | Inoue | C03C 3/091 216/55 |
| 2018/0045232 A1* | 2/2018 | Capostagno | B23K 26/0006 |
| 2018/0193948 A1* | 7/2018 | Zenou | G03F 7/16 |
| 2018/0245616 A1* | 8/2018 | Kumazawa | B23K 26/08 |
| 2018/0272465 A1* | 9/2018 | Ogiwara | B23K 26/04 |
| 2019/0299327 A1* | 10/2019 | Webster | B23K 26/0648 |

FOREIGN PATENT DOCUMENTS

| | | |
|---|---|---|
| DE | 10 2012 008 940 A1 | 11/2013 |
| DE | 102013104548 B3 | 3/2014 |
| DE | 10 2013 015 710 A1 | 7/2014 |
| EP | 1547719 A2 | 6/2005 |
| EP | 1 779 962 A1 | 5/2007 |
| WO | 2009/066571 A1 | 5/2009 |
| WO | 2009114375 A2 | 9/2009 |

OTHER PUBLICATIONS

Ascari et al., "Nanosecond Pulsed Laser Welding of High Carbon Steels", Optics & Laser Technology, 56 (2014), pp. 25-34.

\* cited by examiner

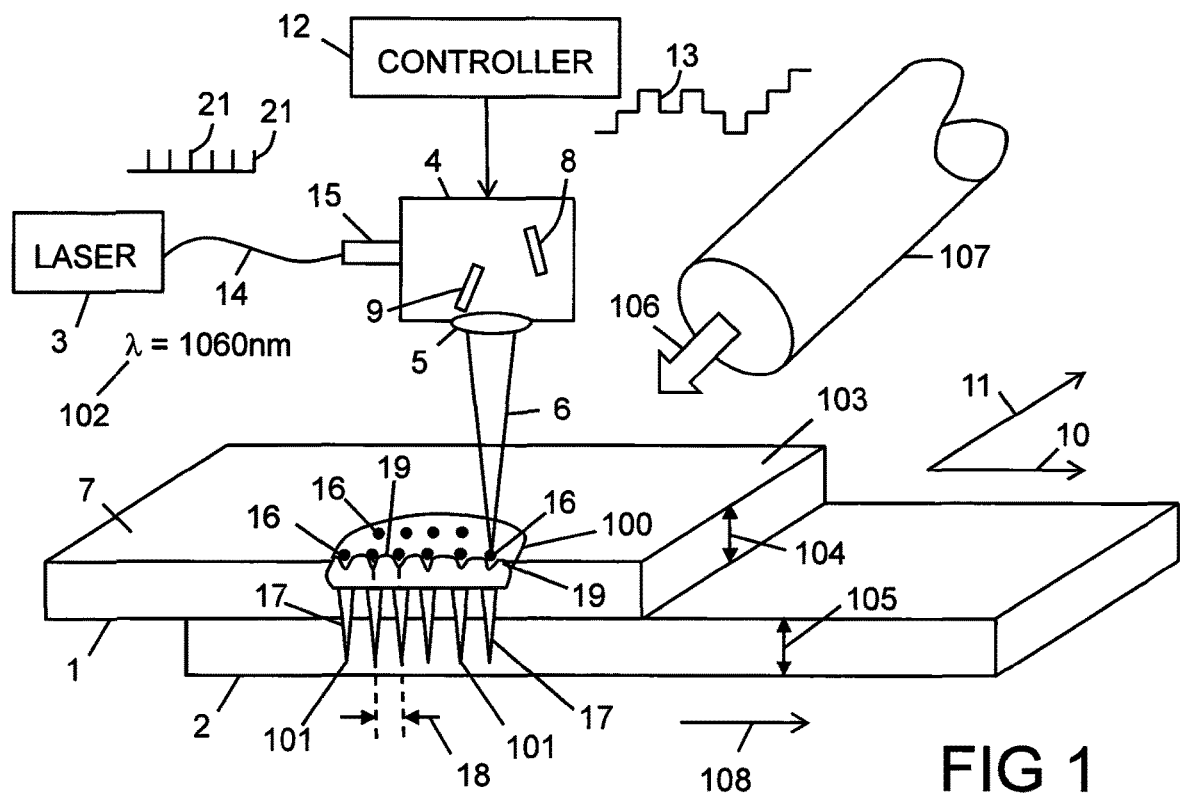
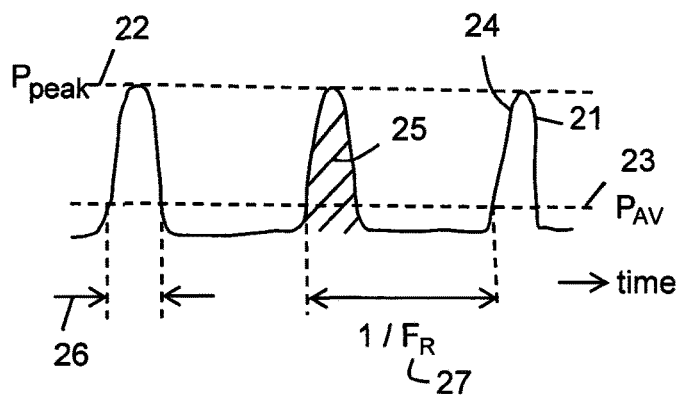
FIG 2
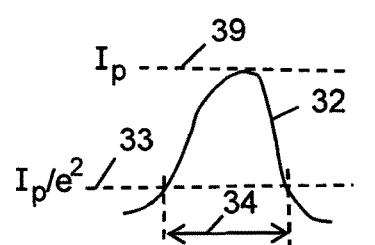
FIG 3
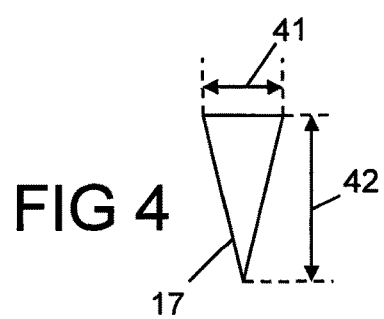
FIG 4

APPARATUS AND METHOD FOR OVERLAP LASER WELDING

FIELD OF INVENTION

This invention relates to an apparatus and method for laser welding. The invention has particular application for welding dissimilar metals, bright metals, and for welding in consumer electronics, electronics packaging, energy storage, ornamental designs, and medical devices.

BACKGROUND TO THE INVENTION

Joining of bright metals such as gold, copper, aluminium, platinum and silver by laser welding in the near infrared spectrum (800 nm to 2500 nm) presents a challenge, as the surface of bright metals are highly reflective with poor absorbance. To overcome the surface reflectivity and initiate coupling of the laser's energy into the metal surface, it is necessary to use laser beams with high power densities.

The function of the beam on a bright material approximates a discreet function with a very narrow operating window from beam hold-off (reflection) and absorption. At first the surface reflects substantially all of the laser light. However, once the surface reflectivity is overcome by sufficient laser intensity, a melt of the surface is initiated. The reflectivity then almost immediately transitions from its original highly reflective condition of more than 80% reflectivity to a lower value, which for some metals, can be less than 50% reflectivity. This causes the melt pool on the surface to grow extremely rapidly. It is consequently very difficult to control.

The challenge is increased when welding thin and low mass sections. Such high power densities are often detrimental, leading to over penetration of the laser beam and resulting unreliable joints. Conversely, if near infrared lasers are operated at lower power densities with beam intensities at or just above the absorbance limits, then this generally results in weak or absent welds as a result of inconsistent and random coupling of the laser beam to the metal surface.

The present preferred method of laser welding of copper and other bright metals such as gold and silver, involves the use of lasers that emit at visible green wavelengths. The most common lasers are frequency doubled 1064 nm lasers that emit at 532 nm. This is because the reflectivity of bright metals is usually significantly lower at 532 nm than at near infrared wavelengths. The laser joining of bright metals with such lasers produces welds that are repeatable and consistent but at the cost of efficiency, complexity, and costs associated with frequency doubling. In some applications, it is necessary to combine a laser emitting at 532 nm with a second laser at 1064 nm in order to increase efficiency and productivity. Such dual wavelength systems require closed loop monitoring of the laser welding process using sophisticated beam monitoring and real time analysis in order to analyze and tailor the structure of the weld. Such diagnostic devices use video analysis of the back reflected light and the weld pool characteristics in order to provide feedback to the laser controller. These systems are complex and expensive.

The use of green lasers has been adopted to perform weld joints of bright metals without specifically addressing the application of joining dissimilar metals. Conventional welding of dissimilar metals relies on specific control of the dilution of the metals at the interface and resulting thermal conditions to minimize mixing of the dissimilar metals which results in so-called intermetallics in the joint. A large intermetallic region is prone to fracture from stresses acting on the joint and the fracture propagates through the entire joint until failure.

Laser welding with continuous wave and pulsed lasers is well known, with either a continuous weld front, or overlapping spot welds in which the weld forms a continuous seam. Defects in the materials caused by the welding process create weaknesses, and are unacceptable in the majority of applications. Pulsed welds are typically formed using microsecond and millisecond pulses, generating melt which resolidifies to form the weld. When welding dissimilar materials, the weld interface can contain intermetallics, which are a compound formed from the two materials being joined, and are typically brittle and undesirable in nature, and the weld can therefore break along this intermetallic layer.

There is a need for a simpler solution for joining bright and dissimilar metals and alloys without problems caused in the joint interface. The method should be able to produce consistent and predictive results on each joint. The resulting weld should have no reliability issues associated with intermetallics.

There is a need for a method for an apparatus and method for laser welding that avoids the aforementioned problems.

The Invention

Accordingly to the present invention there is provided an apparatus which laser welds a first part which is of a first metal to a second part which is of a second metal and which is different to the first metal, which apparatus comprises: a laser which emits a laser beam in the form of laser pulses, a scanner for moving the laser beam with respect to a metal surface of the first metal part, an objective lens which focuses the laser pulses onto the metal surface, and a controller which controls the scanner such that the scanner moves the laser beam with respect to the metal surface to form a plurality of focused spots, characterised in that the apparatus is configured to focus the laser pulses with a spot size and a pulse fluence that causes a formation of a plurality of melt pools in the first metal part and heat stakes in the second metal part, each heat stake extends from a different one of the plurality of melt pools and has a distal end, and the controller is configured to space the plurality of focused spots apart by a distance that is small enough to cause the plurality of melt pools to overlap and that is large enough to ensure the distal ends of the heat stakes are distinct and separate from each other in at least one direction, and the laser is configured to emit pulses having a pulse width in a range 1 ns to 1000 ns.

The invention is particularly attractive because the weld can be formed from two dissimilar metals, one of which can be a bright metal, and can be formed through direct interaction between the materials and a laser beam. The metals can also have different melting points. The resulting weld is robust, repeatable, can be electrically conductive, and has no weaknesses caused by intermetallics.

A method for laser welding a first metal part to a second metal park comprises: placing the first metal part on the second metal part; providing a laser for emitting a laser beam in the form of a laser pulses; providing a scanner for scanning the laser beam with respect to a metal surface of the first metal part; providing an objective lens for focusing the laser pulses onto the metal surface; providing a controller that is adapted to control the scanner such it moves the laser beam with respect to the metal surface, focusing the laser pulses with a spot size and a pulse fluence that cause the formation of a plurality of melt pools in the first metal part and heat stakes in the second metal part, wherein each heat stake extends from a different one of the melt pools and has a distal end, and adapting the controller to space the focused spots apart by a distance that is small enough to cause the melt pools to overlap and that is large enough to ensure the distal end of the heat stakes are distinct and separate from each other in at least one direction.

The laser weld formed by the apparatus of the invention may be autogenous.

The heat stake may have a width that Ls at most half its depth.

The first metal part may be coated.

The first metal part may comprise multiple layers.

The second metal part may comprise multiple layers.

The first metal part may comprise copper or a copper alloy.

The first metal part may comprise a metal selected from the group comprising copper, aluminium, gold, silver, platinum, nickel, titanium, stainless steel, and an alloy containing one of the preceding metals such as bronze, brass, nickel-titanium, and amorphous alloys.

The first metal part may have a reflectivity greater than 80%.

The first metal part may melt when exposed to a pulse energy of 10 mJ or less.

The metal may be aluminium.

The first metal part may comprise copper. The second metal part may comprise nickel plated steel.

The first metal part may comprise aluminium. The second metal part may comprise steel.

The first metal part may have a thickness in a region of the weld of no more than 2 mm. The thickness may be less than 1 mm. The thickness may be less than 0.5 mm.

A Young's modulus of the first metal part may be less than a Young's modulus of the second metal part.

The first metal part may comprise a first metal and the second metal part may comprise a second metal, and the first metal may be substantially more ductile than the second metal.

The heat stakes may be in the form of a spiral.

The invention may provide an article comprising a first metal part when welded to a second metal part, wherein the weld comprises a plurality of melt pools in the first metal part and a plurality of heat stakes in the second metal part, characterised in that each heat stake extends from a different one of the melt pools and has a distal end, the melt pools overlap, and the distal end of the heat stakes are distinct and separate from each other in at least one direction.

Examples of articles are beverage cans, tabs on beverage cans, mobile phones, tablet computers, televisions, machinery, and jewelry.

BRIEF DESCRIPTION OF THE DRAWINGS

Embodiments of the invention will now be described solely by way of example and with reference to the accompanying drawings in which:

FIG. 1 shows apparatus for use in the method according to the present invention;

FIG. 2 shows a pulsed laser waveform;

FIG. 3 shows a laser beam that has been focussed onto a surface;

FIG. 4 shows a heat stake;

DETAILED DESCRIPTION OF PREFERRED EMBODIMENTS OF THE INVENTION

Figure 5:
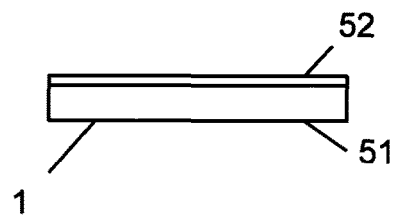
FIG. 5 shows a first metal part that is coated with a coating.

FIG. 1 shows apparatus for laser welding a first metal part 1 to a second metal part 2, which apparatus comprises a laser 3, a scanner 4, an objective lens 5 and a controller 12. The laser 3 emits a laser beam 6 in the form of laser pulses 21. The laser beam 6 is shown being delivered to the scanner 4 via an optical fibre cable 14 and a collimation optic 15. The collimation optic 15 expands and collimates the laser beam 6 and inputs the laser beam 6 into the scanner 4. The scanner 4 is for moving the laser beam with respect to a metal surface 7 of the first metal part 1. The objective lens 5 focuses the laser beam 6 onto the metal surface 7. The controller 12 controls the scanner 4 such that it moves the laser beam 6 with respect to the metal surface 7 to form a plurality of focussed spots 16 on the metal surface 7.

As shown with reference to FIG. 2, the laser pulses 21 can be characterized by an instantaneous peak power 22, an average power 23, a pulse shape 24, a pulse energy 25, a pulse width 26, and a pulse repetition frequency $F_R$ 27. It is important to select the laser 1 such that sufficient peak power 22 can be obtained to overcome the reflectivity of the metal surface 7 in order to ensure sufficient coupling of the pulse energy 25 with the metal surface 7 is achieved in order to melt the metal surface 7.

FIG. 3 shows a spot 31 having a spot size 34 formed by focussing the laser beam 6 onto the metal surface 7. The optical intensity 32 is the power per unit area of the laser beam 6. The optical intensity 32 varies across the radius of the spot 31 from a peak intensity 39 at its centre, to a $1/e^2$ intensity 33 and to zero. The spot size 34 is typically taken as the $1/e^2$ diameter of the spot 31, which is the diameter at which the optical intensity 32 falls to the $1/e^2$ intensity 33 on either side of the peak intensity 39. The area 35 of the spot 31 is typically taken as the cross-sectional area of the spot 31 within the $1/e^2$ diameter.

Pulse fluence 36 is defined as the energy per unit area of the spot 31 on the surface 7. Pulse fluence is typically measured in $J/cm^2$, and is an important parameter for laser welding because weld quality is highly influenced by the pulse fluence 36. The optimum pulse fluence 36 for a particular weld varies between different materials and material thicknesses. The optimum pulse fluence 36 for welding a metal piece part can be determined through experimentation.

Referring again to FIG. 1, the apparatus focuses the laser pulses 21 with a spot size 34 and a pulse fluence 36 that causes the formation of a plurality of melt pools 19 in the first metal part 1 and heat stakes 17 in the second metal part 2. Each heat stake 17 extends from a different one of the melt pools 19 and has a distal end 101. The controller 12 controls the scanner 4 such that the focussed spots 16 are spaced apart by a distance 18 that is small enough to cause the melt pools 19 to overlap and that is large enough to ensure the distal ends 101 of the heat stakes 17 are distinct and separate from each other in at least one direction 108.

Each heat stake 17 is formed by at least one of the pulses 21, the number of pulses 21 being dependent on the pulse fluence 36. Ten to one hundred pulses 21 are typically used for a laser with 1 mJ pulse energy 25. The distance 18 between the centres of the focussed spots 16 will approximate the distance between the centres of the respective heat stakes 17. The controller 12 can cause the scanner 4 to hold the focussed spot 16 still during the formation of each of the heat stakes 17. Alternatively, the controller 12 can cause the scanner 4 to dither the focussed spot 16 during the formation of each of the heat stakes 17, preferably by an amount less than the distance 18. The distance 18 is typically 20 μm to 150 μm, and preferably 40 μm to 100 μm.

The overlapping melt pools 19 and the heat stakes 17 form a composite weld 100. For clarity, FIG. 1 shows the focussed spots 16 as black circles, and the weld 100 in cross section within a three dimensional depiction. The melt pools 19 are shown melted together without boundaries between them, and an interface is shown between the melt pools 19 and the heat stakes 17. Metallurgical studies have demonstrated that both the melt pools 19 and the heat stakes 17 may comprise material that is from both first metal part 1 and the second metal part 2. Good mixing of the metals can be achieved. There is generally no well defined boundary between the melt pools 19 and the heat stakes 17. The distal ends 101 of the heat stakes 17 are shown as ending in a sharp point. However this is not necessarily so; the distal ends 101 may be substantially curved and may be fragmented such that they have more than one end.

Figure 16:
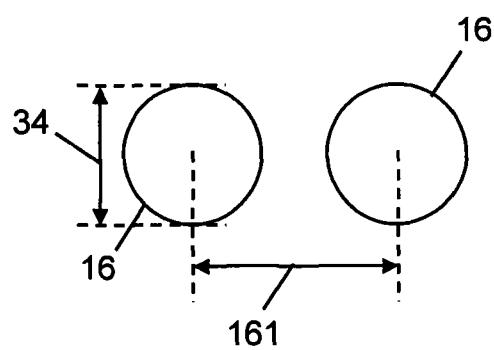
FIG. 16 shows two separated focussed laser spots.
Figure 17:
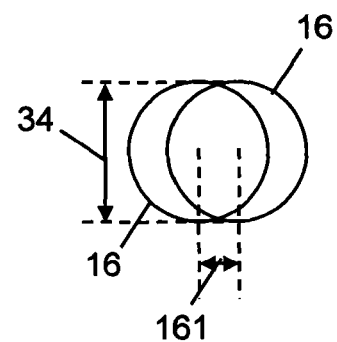
FIG. 17 shows two overlapping focussed laser spots.

Successive focussed laser spots 16 may be separated as shown in FIG. 16 such that the separation 161 between the centres of the laser spots 16 is greater than the spot size 34. Alternatively, successive focussed laser spots 16 may overlap as shown in FIG. 17 such that the separation 161 is less than the spot size 34. In FIGS. 16 and 17, the focussed laser spot 16 may represent a single laser pulse 21 or multiple laser pulses 21.

By "distinct and separate from each other", it is meant that the distal ends 101 of the heat stakes 17 do not form a substantially smooth weld in all directions; the heat stakes 17 may be at least partially separate from each other in at least one direction 108. Alternatively, the heat stakes 17 may be at least partially separate from each other in all directions substantially parallel to the metal surface 7. By "weld" it is meant a connection made by welding or joining.

A shield gas 106 may be applied over the weld 100 from a gas supply 107 in order to prevent the weld 100 oxidising or to keep the weld 100 clean. The shield gas 106 can be argon, helium, nitrogen, or other gases commonly used in laser welding. The shield gas 106 may be mixtures of the aforementioned gases. The gas supply 107 may comprise a gas bottle, a nozzle, and a flow control regulator.

The weld 100 has a substantially jagged surface at the distal ends 101 of the heat stakes 17. This is in direct contrast with conventional welding practice in which a smooth distal end of the weld is thought to be advantageous. A weld line that is not smooth is believed to be a cause for concern in the prior art.

The apparatus is preferably such that the laser pulses 21 are in synchronism with a control signal 13 used to control the scanner 4. This may be achieved by using a synchronisation signal into the controller 12, or by adapting the controller 12 such that the controller also controls the laser 3.

The scanner 4 can be the galvanometric scan head shown in FIG. 1. Alternatively or additionally, the scanner 4 can be a moveable two-dimensional or three-dimensional translation stage, or a robot arm. The scanner 4 is shown as comprising a first mirror 8 for moving the laser beam 6 in a first direction 10, and a second mirror 9 for scanning the laser beam 6 in a second direction 11. The first and the second mirrors 8, 9 would typically be attached to galvanometers (not shown). The scanner 4 and the objective lens 5 may be part of a processing optics known by persons skilled in the art. The processing optic may have additional optical elements like tiled mirrors, additional focus control and/or beam shaping optics.

The laser 3 can be a fibre laser, a solid state rod laser, a solid state disk laser, or a gas laser such as a carbon dioxide laser. The laser 3 can be a nanosecond laser. The laser 3 is preferably a rare-earth-doped nanosecond pulsed fibre laser, such as a ytterbium doped fibre laser, an erbium-doped (or erbium ytterbium doped) fibre laser, a holmium-doped fibre laser, or a thulium doped fibre laser. These lasers emit laser radiation in the 1 μm, 1.5 μm, 2 μm and 2 μm wavelength windows respectively. By a nanosecond pulsed laser, it is meant a laser that can emit pulses having pulse widths 26 in the range 1 ns to 1000 ns. Such lasers may also be able to emit shorter pulses, and longer pulses, and may also be able to emit continuous wave radiation. Such lasers are different from prior art millisecond lasers that are conventionally used for welding. Millisecond lasers can generally form a weld by emitting a single pulse.

A method for laser welding the first metal part 1 to the second metal part 2, will now be described solely by way of example and with reference to FIG. 1. The method comprises: placing the first metal part 1 on the second metal part 2; providing the laser 3 for emitting the laser beam 6 in the form of the laser pulses 21; providing the scanner 4 for moving the laser beam 6 with respect to the metal surface 7 of the first metal part 1; focussing the laser beam 6 onto the metal surface 7; providing the controller 12 that is adapted to control the scanner 4 such it moves the laser beam 6 with respect to the metal surface 7, configuring the apparatus to focus the laser pulses 21 with the spot size 34 and the pulse fluence 36 that cause the formation of the plurality of the melt pools 19 in the first metal part 1 and the heat stakes 17 in the second metal part 2, wherein each heat stake 17 extends from a different one of the melt pools 19 and has a distal end 101, and adapting the controller 4 to space the focused spots 16 apart by the distance 1 that is small enough to cause the melt pools 19 to overlap and that is large enough to ensure the distal ends of the heat stakes 17 are distinct and separate from each other in at least one direction 108.

The method may include the step of providing the shield gas 106 and the gas supply 107, and applying the shield gas 106 over the weld 100. The shield gas 106 can be argon, helium, nitrogen, or other gases commonly used in laser welding. The shield gas 106 may be mixtures of the aforementioned gases. The gas supply 107 may comprise a gas bottle, a nozzle, and a flow control regulator.

In the following, frequent reference will be made to "reflective metals", which is meant to mean metals having a reflectivity greater than 80% at an emission wavelength 102 of the laser 3 at the temperature at which the first metal part 1 is processed.

The laser weld 100 formed by the apparatus or the method of the invention may be autogenous, that is, no other materials other than the first and the second metal parts 1, 2 are added to form the weld.

The first metal part 1 may have a thickness 104 in a region of the weld 100 of no more than 5 mm. The thickness 104 may be less than 2 mm. The thickness 104 may be less than 1 mm. The thickness 104 may be less than 0.5 mm. The second metal part 2 may have a thickness 105 in the region of the weld 100. The thickness 105 may be at least 100 μm. The thickness 105 may be less than 0.5 mm.

Referring to FIG. 4, the heat stake 17 may have a width 41 that is at most half its depth 42. This is advantageous because it allows the heat stake 17 to penetrate further and may allow the first metal part 1 to grip the second metal part 2 better.

As shown in FIG. 5, the first metal part 1 may comprise a metal part 51 which is coated with a coating 52. The coating 52 may be a metal plating such as nickel or chrome, or may be a chemically-induced coating formed by processes such as anodization. The coating 52 may be a polymer coating.

Figure 6:
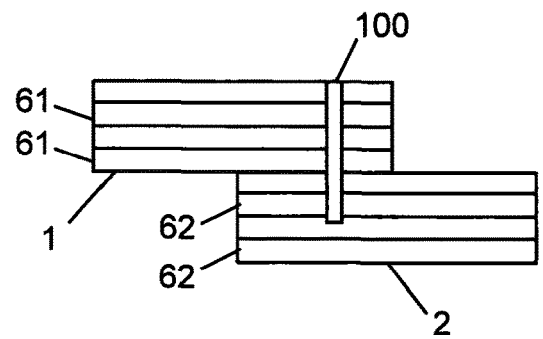
FIG. 6 shows a first metal part that comprises multiple layers.

The first metal part 1 may comprise multiple layers 61 as shown with reference to FIG. 6. The multiple layers 61 may be folded sheets of the same metal, layers of the same metal, or layers of different metals. Alternatively or additionally, the second metal part 2 may comprise multiple layers 62. The multiple layers 62 may be folded sheets of the same metal, layers of the same metal, or layers of different metals. The layers 61 may comprise the same metal as the layers 62, or different metals. The weld 100 is shown joining the first metal part 1 to the second metal part 2. The weld 100 is shown partially penetrating the second metal part 2.

Figure 7:
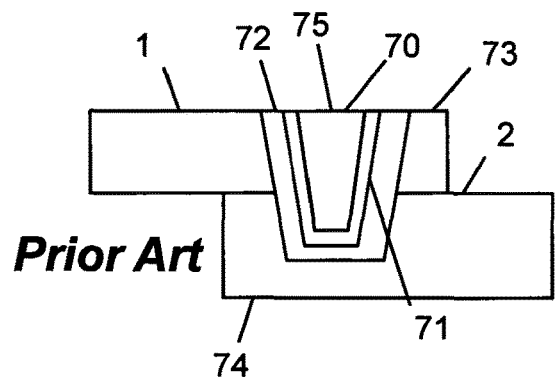
FIG. 7 shows a prior art weld not according to the present invention.

FIG. 7 shows a laser weld 70 between the first metal part 1 and the second metal part 2 using prior art techniques, including for example, laser welding with a green laser using a single high-energy pulse of 100 mJ or more. The weld 70 has a much larger mass than one of the individual melt pools 19 plus its associated heat stake 17 shown with reference to FIG. 1, and consequently takes a longer period to cool down. This results in metallic mixing in a weld pool 75, the formation of an associated boundary layer 71, and an area around the weld 70 that is affected by the heat but where the metals have not flowed—the so-called heat affected zone (HAZ) 72. The mechanical properties of the heat affected zone 72 can be substantially degraded as a result of thermal heat tempering, which tempering should generally be minimized. The heat affected zone 72 is generally visible (for example after etching with acid) on both the top surface 73 of the first metal part 1 and the bottom surface 74 of the second metal part 2.

The boundary layer 71, when welding steel to steel, can result in carbon formation along grain boundary interfaces, thereby providing a pathway for fracturing the weld 100. Similarly, the boundary layer 71 when welding dissimilar metals may comprise intermetallics with a grain structure reflecting the cooling time from fusion to solidification. Such intermetallics are often brittle in nature, and therefore represent a weak point in the weld 70. Thus the existence of the large boundary layer 71 and the heat affected zone 72 are not desirable in either the welding of similar metals or the welding of dissimilar metals.

Whether the weld 70 is formed from similar metals or dissimilar metals, the mechanical properties of the material comprising the weld pool 75 are likely to be weaker than the properties of the base materials that comprise the first metal part 1 and the second metal part 2. Heat affected zones 72 are also of a concern if they affect the appearance or chemical composition of the first and second metal parts 1, 2.

The problems associated with intermetallic layers 71 and heat affected zones 72 increase when welding thin sheet metals. Other issues concerning the time taken for welds to cool down include damage to coatings such as polymers on the first and second metal parts 1, 2.

Figure 8:
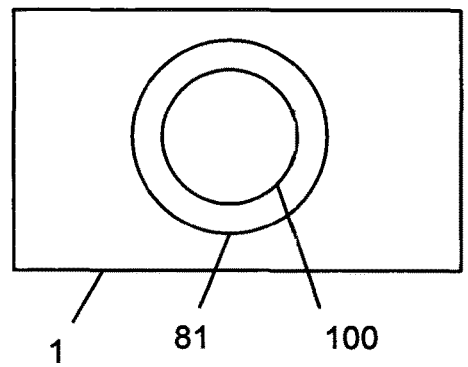
FIG. 8 shows a weld according to the present invention that comprises a heat affected zone.

FIG. 8 depicts a top view of the weld 100 shown in FIG. 1. A heat affected zone 81 is usually visible (possibly after chemical etching). However, with proper selection of the laser 1 and the laser pulse parameters shown with reference to FIGS. 2 and 3, there is generally no heat affected zone visible on the bottom surface. This is because the heat stakes 17 each have significantly less mass than the weld 70, and consequently cool more rapidly. Similarly, there is little or no evidence of intermetallic layers 71 surrounding the heat stakes 17. The lack of intermetallic layers and a heat affected zone that extends through the second metal part 2 provide great advantages over prior art welding techniques.

Figure 9:
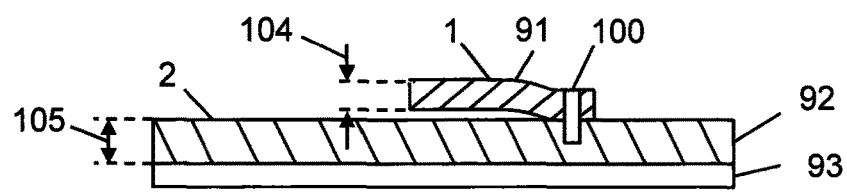
FIG. 9 shows a first metal part in the form of a tab welded to a second metal part.

The second metal part 2 shown in FIG. 9 may comprise a metal part 92 which is coated with a coating 93. The coating 93 may be a metal plating such as nickel or chrome, or may be a chemically-induced coating such as an anodization. The first metal part 1 may be a tab 91 such as found in beverage cans. The tab 91 is shown welded to the second metal part 2 with the weld 100.

Beverage cans are often made from thin sheets of aluminium that are less than 250 μm in thickness. In a beverage can, the coating 93 would be a polymer coating usually applied before the weld 100 is formed. It is important that the method of forming the weld 100 does not degrade the coating 93. The apparatus and method of the present invention achieves this by virtue of the heat stakes 17, shown with reference to FIG. 1, as there is less heat generated in the second metal part 2 compared to a prior art weld.

Referring again to FIG. 1, the first metal part 1 and the second metal part 2 may be formed from the same metal. The metal may be aluminium or copper, or alloys thereof. Alternatively, the first metal part 1 and the second metal part 2 may be formed from different metals.

The first metal part 1 may comprise copper or a copper alloy.

The first metal part 1 may comprise a metal selected from the group comprising copper, aluminium, gold, silver, platinum, nickel, titanium, stainless steel, and an alloy containing one of the preceding metals such as bronze, brass, nickel-titanium, and amorphous alloys.

The first metal part 1 may have a reflectivity 103 greater than 80% at the wavelength (λ) 102 emitted by the laser 3. FIG. 1 shows the wavelength 102 being 1060 nm; this is intended to be non-limiting. Ytterbium pulsed fibre lasers are especially attractive to use as the laser 3; these emit in the wavelength range from approximately 1030 nm to approximately 1100 nm. The laser 3 can also be an erbium doped, or erbium ytterbium co-doped fibre laser, each emitting at around 1550 nm, or a holmium or thulium doped fibre laser emitting at around 2000 nm. The use of lasers emitting at 1500 nm and 2000 nm provide eye safety advantages that are important in certain applications. There are also many other laser types that emit in the near infra-red wavelengths.

The spot size 34 may be 25 μm to 100 μm, and preferably 30 μm to 60 μm.

The first metal part 1 may melt when exposed to a pulse energy 25 of 10 mJ or less. The pulse energy 25 may be 4 mJ or less. The pulse energy 25 may be 1 mJ or less. The pulse energy may be 100 µJ or less. The pulse energy may be 10 µJ or less. Thicker materials require larger pulse energies 25 than thinner materials.

The first metal part 1 may comprise copper. The second metal part 2 may comprise nickel plated steel.

The first metal part 1 may comprise aluminium. The second metal part 2 may comprise steel.

The first metal part 1 may be defined by a Young's modulus which is less than a Young's modulus of the second metal part 2.

The first metal part 1 may comprise a first metal and the second metal part 2 may comprise a second metal. The Young's modulus of the first metal may be less than a Young's modulus of the second metal. Advantageously, the first metal may be substantially more ductile than the second metal. This has important advantages if the weld 100 is repeatedly strained since the heat stakes 17 will be more resistant to metal fatigue resulting in failure.

Figure 10:
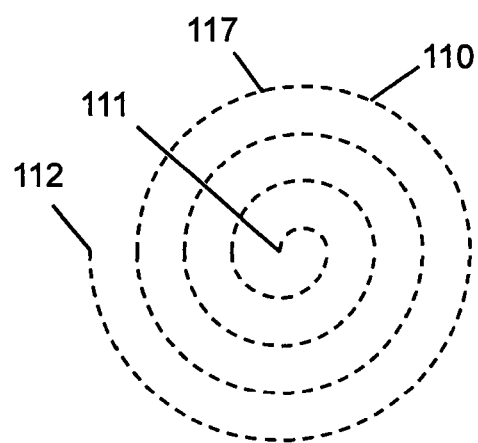
FIG. 10 shows a welding trajectory in the form of a spiral.
Figure 11:
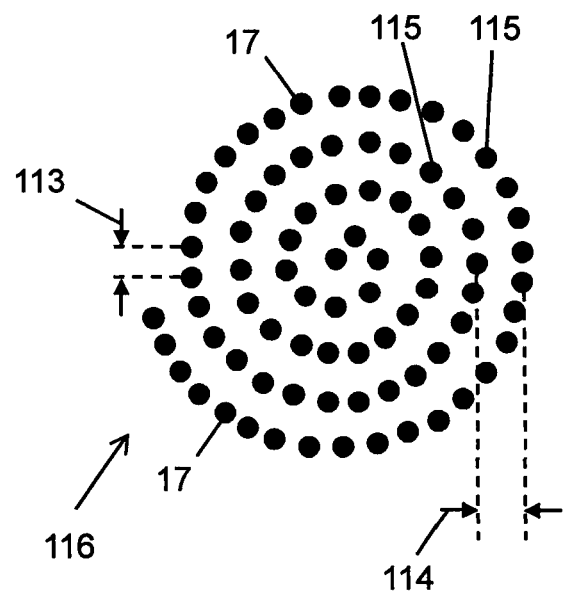
FIG. 11 shows a weld in the form of a spiral comprising individual heat stakes.

The heat stakes 17 are preferably formed in a line that is not linear in order to increase the shear strength of the weld 100. For example, the heat stakes 17 may be formed in the form of a spiral 110 as shown with reference to FIG. 10. The spiral 110 is formed by causing the controller 12 to move the laser beam 6 in a trajectory 117 that is in the form of the spiral 110, and which has a first location 111 shown as being in the inside of the spiral, and a second location 112, shown as being on the outside of the spiral. It is generally preferred that the spiral trajectory 117 starts from the first location 111, but may alternatively start from the second location 112. FIG. 11 shows a cross section through the resulting weld 116, which cross section is beneath the overlapping melt pools 19, shown with reference to FIG. 1. As shown with reference to FIG. 16, the successive focussed spots 16 are separated by the distance 161 which is greater than the spot size 34. It is preferred that the laser 3 is pulsed at least once, and preferably between ten to one hundred times, on each of the focussed spots 16. By this means, it is possible to control the amount of heat being injected into each part of the weld 116 very precisely, thus allowing the strength of the weld 116 to be optimised. The choice of whether to commence from the first location 111 or the second location 112 can be determined experimentally from the strength of the resulting weld 116. In FIG. 11, a distance 113 is shown between the centres of two of the heat stakes 17, and a distance 114 between centres of adjacent spiral arms 115. The distance 113 can be less than 100 µm, less than 75 µm, and preferably less than 50 µm. The distance 114 can be less than 250 µm, less than 200 µm, less than 150 µm, and preferably less than 100 µm. Optimizing the distances 113, 114 can be achieved experimentally by measuring physical parameters such as peel strength, shear strength, and electrical contact resistance.

Figure 12:
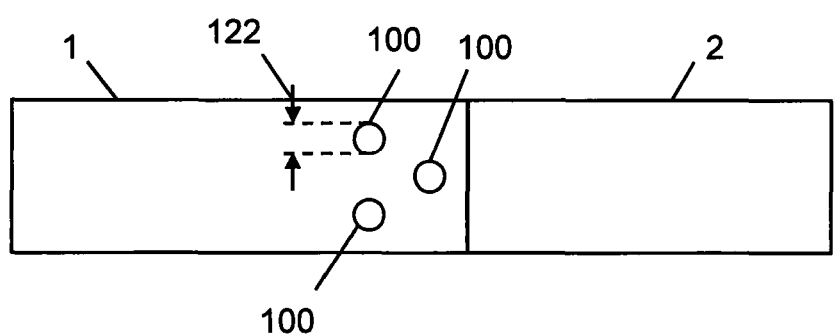
FIG. 12 shows a first metal part joined to a second metal part using three welds.

FIG. 12 shows the first metal part 1 welded to the second metal part 2 with three of the welds 100. The welds 100 can be the spiral weld 116 shown with reference to FIG. 11. The welds 100 can have a diameter 122 of between 0.5 to 2 mm, and preferably between 0.75 to 1.5 mm. By using a plurality of the welds 100, more strength and rigidity is obtained.

Figure 13:
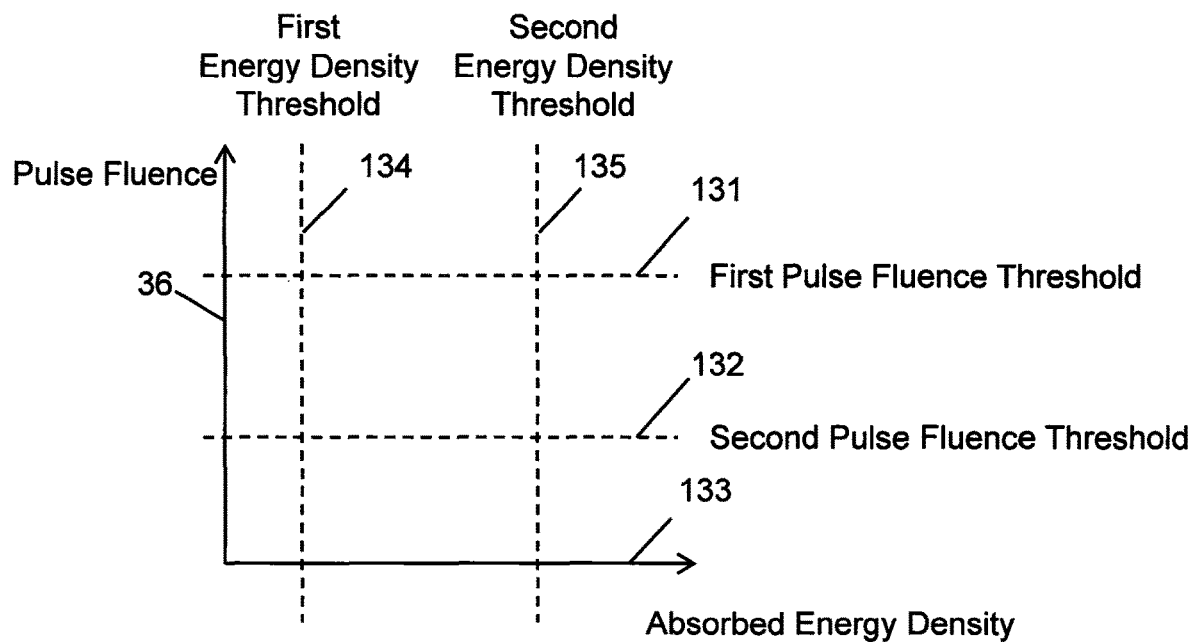
FIG. 13 shows a graph of pulse fluence versus absorbed energy density.

FIG. 13 shows a graph of pulse fluence 36 and absorbed energy density 133, where the absorbed energy density 133 is the total pulse energy 25 absorbed by the first and the second metal parts 1, 2 per unit surface area by the laser pulses 21. In order to initiate the weld 100 shown with reference to FIG. 1, it is necessary to use a pulse fluence 36 that is at least equal to the first pulse fluence threshold 131. This is in order to initiate coupling of the laser beam 6 to the metal surface 7, and the melting of the metal surface 7. Once the metal surface 7 has begun to melt, the remaining pulses 21 should have a pulse fluence that is at least equal to the second pulse fluence threshold 132. The second pulse fluence threshold 132 can be substantially less than the first pulse fluence threshold 131. For a first metal part 1 with high reflectivity, that is, reflectivities at the wavelength of the laser beam 6 greater than 80%, the second pulse fluence threshold 132 can be between two and ten times smaller than the first pulse fluence threshold 131. As each of the pulses 121 is absorbed, they contribute to the absorbed energy density 133. The absorbed energy density 133 absorbed at each of the focussed locations 16 should be at least equal to the first energy density threshold 134 at which the laser stake 17 begins to penetrate the second metal part 2, but less than the second energy density threshold 135 at which the weld 100 becomes unacceptably brittle. It can be seen that by varying the pulse parameters shown with reference to FIGS. 2 and 3, the number of pulses, and the distances 18 between focussed spots 16, there is a great controllability of the weld 100, and moreover, greater control over its formation, and therefore mechanical properties, than prior art techniques.

Figure 14:
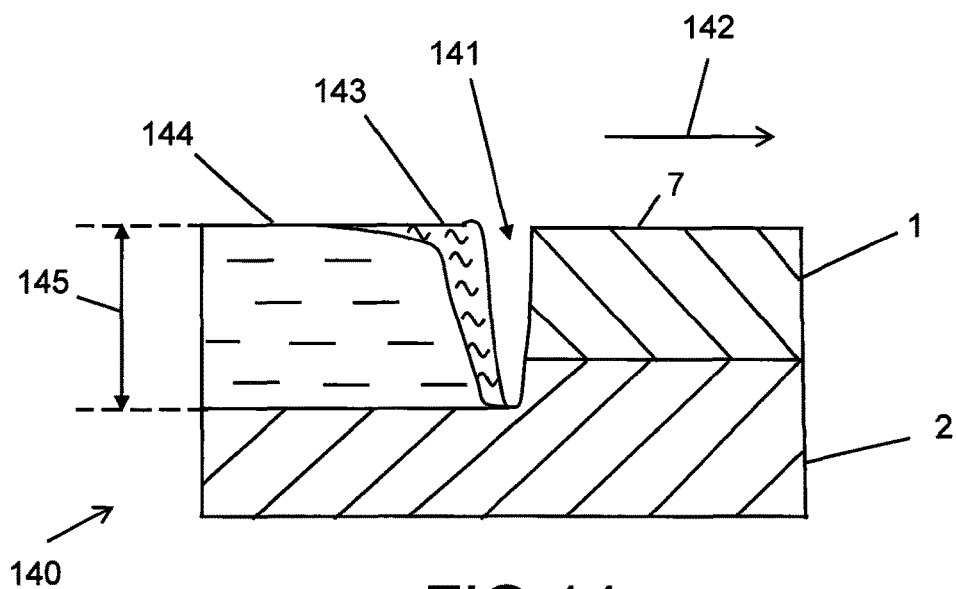
FIG. 14 shows a key hole weld.

FIG. 14 shows a key hold weld 140 that joins the first metal part 1 to the second metal part 2. In this process, the laser beam 6 not only melts the first and the second metal parts 1, 2 to form molten metal 143, but also produces vapour (not shown). The dissipating vapour exerts pressure on the molten metal 143 and partially displaces it. The result is a deep, narrow, vapour filled hole called the keyhole 141. Such a process may be involved in the formation of the heat stakes 17 in the apparatus and method of the invention.

The key hole 141 is surrounded by the molten metal 143, and moves with the laser beam 6 in the direction 142 that the laser beam 6 is scanned. The molten metal 143 solidifies behind the key hole 141 as it moves, forming a weld seam 144. The weld seam 144 is deep and narrow. The weld depth 145 may be up to ten times greater than the weld width 151 shown with reference to FIG. 15. The laser beam 6 is absorbed with high efficiency in the key hole 141 as it is reflected multiple times.

Figure 15:
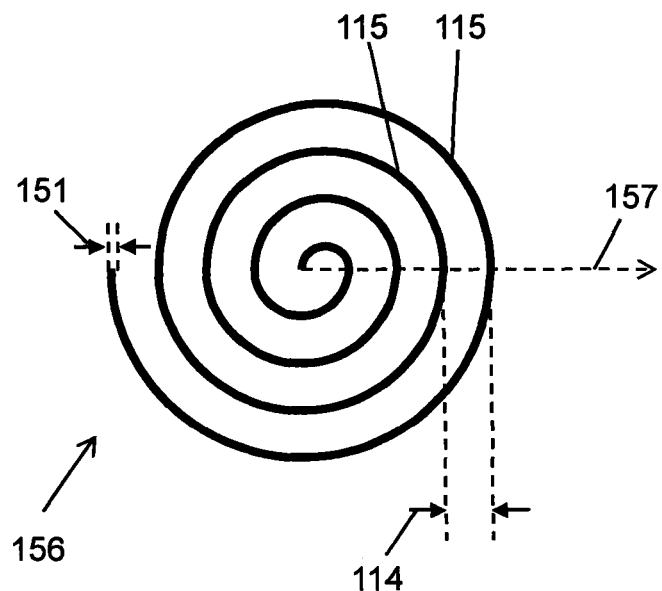
FIG. 15 shows a weld in the form of a continuous spiral.

The apparatus and method of the invention extend to the case in which the heat stake 17 forms a continuous weld 156, as shown with reference to FIG. 15. Here the controller 12 has controlled the scanner 4 to scan the laser beam 6 in the spiral 110 shown with reference to FIG. 10 such that successive focussed spots 16 shown with reference to FIG. 17 overlap. The focussed spots 16 have resulted in the heat stake 17 that is continuous in the direction of the spiral arms 115, but which is at least partially separate in a radial direction 157. The radial direction 157 can be the direction 108 in FIG. 1. As shown by the cross section in FIG. 1, it is preferred that the melt pools 19 overlap. The weld 100 shown with reference to FIGS. 1 and 12 can be the continuous weld 156 of FIG. 15. The weld 100 may be formed with the key hole 141 described with reference to FIG. 14.

A method will now be described with reference to the apparatus and method described with reference to FIG. 1 and to the non-limiting examples set out below. The laser 3 was a nanosecond ytterbium-doped fibre laser, model SPI G4 70EP-Z manufactured by SPI Lasers UK Ltd of Southampton, England. The laser 3 is a master oscillator power amplifier having excellent control over the laser parameters shown in FIG. 2, namely the peak power 22, the average power 23, the pulse shape 24, the pulse energy 25, the pulse width 26, and the pulse repetition frequency $F_R$ 27. The scanner 4 was a galvanometer-scanner model Super Scan II manufactured by Raylase of Munich, Germany with a 10 mm beam aperture (not shown). The controller 12 comprised a desktop computer with a Windows 8 operating system on which SCAPS scanner application software licensed by SCAPS GmbH of Munich, Germany was used to program, operate, and store the code for the scanner 4 for steering the laser beam 6. The lens 5 was a 163 mm focal length F-theta lens. The collimator 15 had a 75 mm focal length. The lens 5, the collimator 15, and the scanner 4 were configured to form and translate the laser beam 6 onto the surface 7 of the first metal part 1 with a focused spot 16 having a spot size 34 of 40 µm and an area 35 of $1.256 \times 10^{-5}$ cm$^2$.

EXAMPLE 1

With reference to FIG. 12, the first metal part 1 was copper grade C110 with a 150 µm thickness, and the second metal part 2 was aluminium grade 5052 with a 500 µm thickness. Following experimentation to determine the peak power 22, the pulse shape 24, the pulse energy 25, the pulse width 26, and the pulse fluence 36, it was decided to scan the laser beam 6 at a linear speed of 50 mm/s over the metal surface 7 and with the distance 161 (shown with reference to FIG. 17) between successive of the focussed spots 16 of 0.7 µm (measured centre to centre). This corresponds to the pulse repetition frequency 27 of 70 kHz. The appropriate control parameters were then fed into the controller 12 and the laser 3 set up accordingly, The laser beam 6 was repetitively pulsed at the pulse repetition frequency 27 of 70 kHz, and scanned over the metal surface 7 in the spiral 110 shown with reference to FIG. 10. The spiral was formed with a 50 mm/s linear speed. The total lengh of the spiral 110 was 15.8 mm, and was formed from the first location 111 to the second location 112. The diameter 122 of the weld 100 was 1 mm. The pulse width 26 was 115 ns at full width half maximum FWHM and 520 ns at 10% of instantaneous peak power 22. Total pulse energy 25 was 1 mJ with an average power 23 of 70 W and a peak power 22 of 5 kW. Each laser pulse 21 had a peak power intensity of $3.98 \times 10^{+8}$ W/cm$^2$ with a pulse fluence 36 of 79.6 J/cm$^2$. A shield gas mixture 106 was used of 50% Argon and 50% Helium supplied thorough a flow control regulator at 10 cubic feet per hour from a 6 mm diameter copper nozzle 107 over the weld 100. The weld 100 that was formed is of the type shown in FIG. 15. The heat stakes 17 form a continuous line along the spiral, and are at least partially separated in a radial direction 157 across the spiral, corresponding to the direction 108 shown in FIG. 1. The weld pools 19 are continuous across the entire surface area of the weld 100, though as shown in FIG. 1, the surface of the weld 100 is not smooth. Observation of the welds 100 revealed aluminium colouring on its top surface, 103, indicating that the metals have mixed in the weld. The welds 100 were observed to be extremely strong for their size.

EXAMPLE 2

With reference to FIG. 12, the first metal part 1 was copper grade C110 with a 150 µm thickness, and the second metal part 2 was also copper grade C110 with a 150 um thickness. After experimentation, it was determined that the same process parameters could be used as described with reference to Example 1. The resulting welds were observed to be extremely strong for their size.

EXAMPLE 3

With reference to FIG. 12, the first metal part 1 was stainless steel grade 304 with a 250 um thickness 104 and the second part 2 was grade stainless steel 304 with a 250 um thickness 105. Following experimentation to determine the peak power 22, the pulse shape 24, the pulse energy 25, the pulse width 26, and the pulse fluence 36, it was decided to scan the laser beam 6 at a linear speed of 225 mm/s over the metal surface 7 and with the distance 161 (shown with reference to FIG. 17) between successive of the focussed spots 16 of 0.225 µm (measured centre to centre). This corresponds to the pulse repetition frequency 27 of 1 MHz. The appropriate control parameters were then fed into the controller 12 and the laser 3 set up accordingly, The laser beam 6 was repetitively pulsed at the pulse repetition frequency 27 of 1 MHz, and scanned over the metal surface 7 in the spiral 110 shown with reference to FIG. 10. The spiral 110 was formed with a 225 mm/s linear speed. The spiral 110 was formed from the first location 111 to the second location 112. The diameter 122 of the weld 100 was 1 mm. The pulse width 26 was 9 ns at full width half maximum FWHM and 9 ns at 10% of instantaneous peak power 22. Total pulse energy 25 was 7 µJ with an average power 23 of 70 W and a peak power 22 of 8 kW. Each laser pulse 21 had a peak power intensity of $6.36 \times 10^{+8}$ W/cm$^2$ with a pulse fluence 36 of 5.6 J/cm$^2$. A shield gas mixture 106 was used of 50% Argon and 50% Helium supplied thorough a low control regulator at 10 cubic feet per hour from a 6 mm diameter copper nozzle 107 over the weld 100. The weld 100 that was formed is of the type shown in FIG. 15. The heat stakes 17 form a continuous line along the spiral, and are at least partially separated in a radial direction 157 across the spiral, corresponding to the direction 108 shown in FIG. 1. The weld pools 19 are continuous across the entire surface area of the weld 100, though as shown in FIG. 1, the surface of the weld 100 is not smooth. Because of the different parameters being used, the weld 100 resembled a traditional lap weld, with excellent mixing of the metals, but almost negligible heat affected zone 72 (shown with reference to FIG. 7). However, the continuous heat stakes 17 did extend from the weld, resulting in an uneven surface as shown in FIG. 1 across the radius 157 of the weld 100. However the extension of the heat stakes 17 from the weld 100 was substantially less than observed for the copper aluminium and copper copper welds of Examples 1 and 2 respectively. The welds 100 were observed to be extremely strong for their size.

It is to be appreciated that the embodiments of the invention described above with reference to the accompanying drawings have been given by way of example only and that modifications and additional steps and components may be provided to enhance performance. Individual components shown in the drawings are not limited to use in their drawings and may be used in other drawings and in all aspects of the invention.

The invention claimed is:

1. An apparatus which laser welds a first part which is of a first metal to a second part which is of a second metal and which is different to the first metal, which apparatus comprises:

a laser which emits a laser beam in the form of laser pulses, a scanner for moving the laser beam with respect to a metal surface of the first metal part, an objective lens which focuses the laser pulses onto the metal surface, and a controller which controls the scanner such that the scanner moves the laser beam with respect to the metal surface to form a plurality of focused spots, characterised in that the apparatus is configured to focus the laser pulses with a spot size and a pulse fluence that causes a formation of a plurality of melt pools in the first metal part and heat stakes in the second metal part, each heat stake extends from a different one of the plurality of melt pools and has a distal end, the controller is configured to space the plurality of focused spots apart by a distance that is small enough to cause the plurality of melt pools to overlap and that is large enough to ensure the distal ends of the heat stakes are distinct and separate from each other in at least one direction, and the laser is configured to emit pulses having a pulse width in a range 1 ns to 1000 ns.

2. An Apparatus according to claim 1, wherein the spot size is between 25 μm and 100 μm.

3. An Apparatus according to claim 2 wherein the spot size is between 30 μm and 60 μm.

4. An Apparatus according to claim 1 wherein the laser is configured to provide a pulse energy of 10 mJ or less.

5. An Apparatus according to claim 4 wherein the pulse energy is 1 mJ or less.

6. An Apparatus according to claim 1 wherein the laser is configured to provide between ten to one hundred pulses on the focused spot.

* * * * *